A. DISPOT.
COUPLING FOR COUPLING PUMPS TO ELECTRIC MOTORS.
APPLICATION FILED MAR. 3, 1919.

1,349,329. Patented Aug. 10, 1920.

Inventor
A. Dispot.
By H. R. Kerslake
Atty

UNITED STATES PATENT OFFICE.

ARTHUR DISPOT, OF PARIS, FRANCE.

COUPLING FOR COUPLING PUMPS TO ELECTRIC MOTORS.

1,349,329.

Specification of Letters Patent.  Patented Aug. 10, 1920.

Application filed March 3, 1919. Serial No. 280,264.

*To all whom it may concern:*

Be it known that I, ARTHUR DISPOT, a citizen of the French Republic, residing at No. 23 Rue de Ponthieu, Paris, France, have invented certain new and useful Improvements in Couplings for Coupling Pumps to Electric Motors, of which the following is a specification.

This invention has for its object to provide an improved coupling for coupling a pump directly to an electric motor. The improved coupling is designed to facilitate the rapid coupling and uncoupling of the two machines with and from each other. The invention also allows of increasing the tolerance limits in manufacture.

The accompanying drawings illustrate by way of example two constructional forms of a coupling according to this invention.

Figure 1:
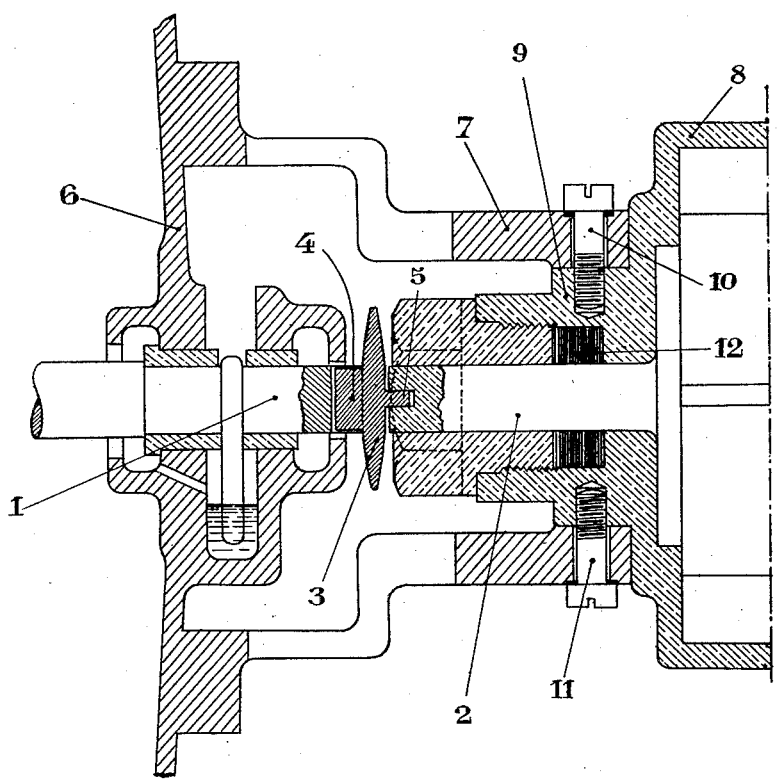
Figure 1 is an axial section of a suitable constructional form.
Figure 2:
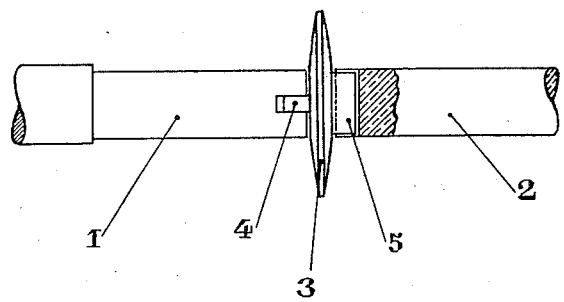
Fig. 2 is a plan view of the two shafts and the coupling member.

As shown in the drawings, the connection between the shaft 1 of the motor and the shaft 2 of the pump is established by means of a special device consisting of a disk 3 preferably of lens-shape, formed on its opposite faces with two tenons 4 and 5 arranged in planes at right angles to each other. These tenons 4 and 5 engage in correspondingly shaped slots formed in the ends of the shafts 1 and 2.

By this means the driving and driven shafts are coupled together by an improved coupling constituting a new use of the well known Oldham coupling. This improved coupling is very flexible so that it facilitates very considerably a connection between the two shafts from a manufacturing point of view.

The frame plate 6 of the motor, situated on the side nearest the pulley, comprises a trunk 7 which is cast in one piece with or attached thereto, and is designed to receive the pump 8. This trunk is bored concentrically to the axis of the motor.

The pump 8 is formed with a neck 9 fitted to the trunk 7 and fastened to it by bolts 10 and 11. The dimensions of these several parts are such that the shafts 1 and 2 of the motor and pump come into alinement with each other within a few millimeters away from each other. The coupling member 3 is placed in the space thus left between the adjacent ends of the two shafts.

The disk 3 of the coupling member while serving to transmit the power of the motor to the pump, acts also as a screen between these two machines; it prevents any liquid that may leak through the stuffing box 12 from reaching the motor.

The improved coupling is adapted for use with rotary pumps of all types. It is equally adapted for use in driving any kind of receiving device by means of a rotary motor, in all cases where it is advisable to provide a certain degree of flexibility between the motor and the driven device.

What I claim is:—

In a coupling for the direct coupling together of a pump and an electric motor the combination with the motor shaft and the driven pump shaft located substantially in alinement with each other with a short distance left between the adjacent ends of the two shafts, of a disk of relatively large diameter as compared with the diameter of the shafts located between said two shaft ends with its plane approximately at right angles to the axes of said two shafts, two tenons formed on opposite faces of said disk, extending across said axes and disposed each at right angles to the other, and corresponding slots formed in the said adjacent ends of said two shafts to receive said tenons, whereby the rotational driving power is transmitted from said motor shaft to said pump shaft, and any leakage of liquid that may have leaked through the pump shaft stuffing box will be caught and deflected by said disk and thereby prevented from reaching the motor.

In testimony whereof I have signed my name to this specification.

ARTHUR DISPOT.